United States Patent
Pham et al.

(10) Patent No.: US 10,990,598 B2
(45) Date of Patent: Apr. 27, 2021

(54) AGGREGATING QUANTILE METRICS IN MULTIDIMENSIONAL DATA SETS

(71) Applicant: Microsoft Technology Licensing, LLC, Redmond, WA (US)

(72) Inventors: Steven Pham, San Francisco, CA (US); John C. Moon, San Jose, CA (US); Yumo Liu, Sunnyvale, CA (US); Ruixuan Hou, Sunnyvale, CA (US); Fenghuan Lu, Sunnyvale, CA (US); David Q. He, Cupertino, CA (US)

(73) Assignee: Microsoft Technology Licensing, LLC, Redwood Shores, CA (US)

( * ) Notice: Subject to any disclaimer, the term of this patent is extended or adjusted under 35 U.S.C. 154(b) by 281 days.

(21) Appl. No.: 16/263,279

(22) Filed: Jan. 31, 2019

(65) Prior Publication Data
US 2020/0250193 A1 Aug. 6, 2020

(51) Int. Cl.
*G06F 16/2455* (2019.01)
*G06F 16/28* (2019.01)
*G06F 16/2453* (2019.01)
*G06F 16/2458* (2019.01)

(52) U.S. Cl.
CPC .... *G06F 16/24556* (2019.01); *G06F 16/2462* (2019.01); *G06F 16/24545* (2019.01); *G06F 16/283* (2019.01); *G06F 16/24535* (2019.01)

(58) Field of Classification Search
USPC ........................................................ 707/737
See application file for complete search history.

(56) References Cited

U.S. PATENT DOCUMENTS

| | | | | |
|---|---|---|---|---|
| 6,408,292 B1* | 6/2002 | Bakalash | ........... | G06F 16/24556 |
| 6,868,041 B2* | 3/2005 | Preston | ............... | G01S 7/52004 367/88 |
| 7,716,155 B2* | 5/2010 | Aggarwal | ......... | G06F 16/24568 706/58 |
| 8,533,318 B2* | 9/2013 | Chambers | .............. | G06Q 10/06 709/224 |

(Continued)

OTHER PUBLICATIONS

Ted Dunning et al., "Computing Extremely Accurate Quantiles Using t-Digests", Retrieved from: https://github.com/tdunning/t-digest/blob/master/docs/t-digest-paper/histo.pdf, Feb. 6, 2019.

*Primary Examiner* — Cam Linh T Nguyen
(74) *Attorney, Agent, or Firm* — Hickman Becker Bingham Ledesma LLP (57) ABSTRACT

The disclosed embodiments provide a system for processing data. During operation, the system obtains a set of partitions containing records spanning a time interval, wherein the records include a set of values for a metric and a set of dimensions associated with the set of values. For each dimensional subset associated with the set of dimensions, the system aggregates, based on the set of partitions, a corresponding subset of values for the metric into a distribution-based representation of the metric. The system then stores a dictionary encoding of the dimensional subset in association with the distribution-based representation of the metric. Finally, the system calculates, based on the distribution-based representation, one or more quantiles associated with the dimensional subset and outputs the quantile(s) for use in characterizing a distribution of the metric.

20 Claims, 7 Drawing Sheets

(56) References Cited

U.S. PATENT DOCUMENTS

| | | | | |
|---|---|---|---|---|
| 8,732,118 B1* | 5/2014 | Cole | ............... | G06F 16/254 |
| | | | | 707/607 |
| 8,938,416 B1* | 1/2015 | Cole | ............... | G06F 16/24556 |
| | | | | 707/607 |
| 9,330,129 B2* | 5/2016 | Vemuri | ............... | G06F 16/2272 |
| 9,411,853 B1* | 8/2016 | Dovrtel | ............... | G06F 16/283 |
| 10,025,813 B1* | 7/2018 | Gebremariam | ............... | G06F 7/02 |
| 2010/0088341 A1* | 4/2010 | Ah-Soon | ............... | G06F 21/6227 |
| | | | | 707/783 |
| 2010/0287176 A1* | 11/2010 | Mobbs | ............... | G06F 16/283 |
| | | | | 707/765 |
| 2015/0032730 A1* | 1/2015 | Cialdea, Jr. | ............... | G06F 16/283 |
| | | | | 707/722 |
| 2018/0268080 A1* | 9/2018 | Christian | ............... | G06F 16/283 |
| 2018/0365715 A1* | 12/2018 | Malhotra | ............... | G06N 5/043 |

* cited by examiner

AGGREGATING QUANTILE METRICS IN MULTIDIMENSIONAL DATA SETS

BACKGROUND

Field

The disclosed embodiments relate to data analysis. More specifically, the disclosed embodiments relate to techniques for aggregating quantile metrics in multidimensional data sets.

Related Art

Analytics may be used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

However, significant increases in the size of data sets have resulted in difficulties associated with collecting, storing, managing, transferring, sharing, analyzing, and/or visualizing the data in a timely manner. For example, conventional software tools and/or storage mechanisms may be unable to handle petabytes or exabytes of loosely structured data that is generated on a daily and/or continuous basis from multiple, heterogeneous sources. Instead, management and processing of "big data" may require massively parallel software running on a large number of physical servers. In addition, querying of large data sets may result in high server latency and/or server timeouts (e.g., during processing of requests for aggregated data), and/or the crashing of client-side applications such as web browsers (e.g., due to high data volume).

Consequently, big data analytics may be facilitated by mechanisms for efficiently and/or effectively collecting, storing, managing, querying, analyzing, and/or visualizing large data sets.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for aggregating quantile metrics in multidimensional data sets. The quantile metrics may be calculated using real-time and/or near-real-time event streams of records. Each record may include one or more metrics and one or more dimensions associated with the metric. For example, the event stream may be used to transmit records of page load times, request times, download times, rendering times, and/or other metrics related to loading of pages in a web application, native application, mobile application, and/or other type of application. The records may also include locations, browser types, operating systems, devices pages, environments, and/or other dimensions that provide context related to the page load times.

To calculate quantiles from multiple dimensional combinations associated with the records, each dimensional combination may be represented using a dictionary encoding. For example, dimensions in the records may be compressed into integer encodings, which are stored in a given order for each dimensional combination to represent dimensional values within the dimensional combination.

Each dictionary encoding is mapped to a distribution-based representation of the metric that is generated for the corresponding dimensional combination, and the distribution-based representation is used to calculate one or more quantiles for the dimensional combination. For example, values of the metric that span a given time interval and are associated with a certain set of dimensions may be aggregated into a fixed number of clusters representing different locations in the distribution of the metric. A quantile associated with the set of dimensions may then be calculated by aggregating values associated with the clusters up to the location of the quantile and dividing by the total number of values associated with the dimensional combination. Mappings of dictionary encodings to distribution-based representations of the metric may then be transferred from memory to storage and/or event streams when in-memory representations of the mappings exceed a certain size and/or fill a time window encompassing a certain number of time intervals.

Late records that are received after the corresponding distribution-based representations have been flushed from memory are routed to a separate event stream for the late records. Dimensions in each of the late records may then be matched to the corresponding dimensional subset in storage, and the distribution-based representation of the metric to which the dimensional subset is mapped is updated based on values of the metric in the late record.

By calculating quantiles for multiple dimensional combinations using compact distribution-based representations of the corresponding metrics and dictionary encodings of the dimensional combinations, the disclosed embodiments may allow the quantile computations to scale with data volume and/or numbers of dimensions. In turn, the disclosed embodiments may allow quantiles to be computed from streaming data on a real-time or near-real-time basis. The disclosed embodiments may additionally reduce computational and/or memory overhead associated with conventional techniques that calculate quantiles based on orderings of raw data points and/or that associate the data points and/or quantiles with uncompressed representations of the corresponding dimensional combinations. Consequently, the disclosed embodiments may improve the performance of applications, computer systems, and/or technologies for processing streaming data, monitoring performance metrics, and/or calculating quantiles from metrics.

Aggregating Quantile Metrics in Multidimensional Data Sets

Figure 1:
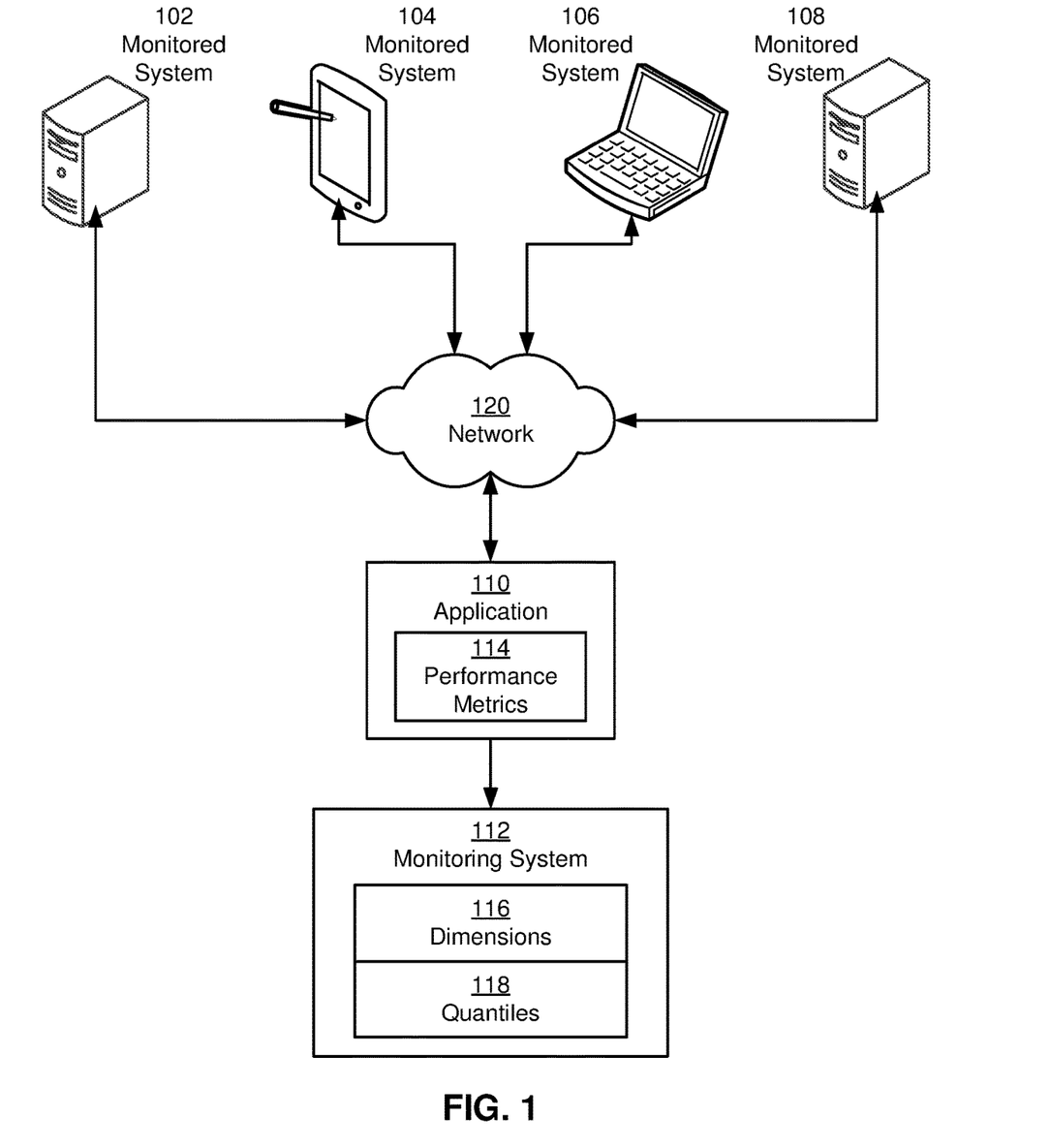
FIG. 1 shows a schematic of a system in accordance with the disclosed embodiments.

FIG. 1 shows a schematic of a system in accordance with the disclosed embodiments. As shown in FIG. 1, the system includes a monitoring system 112 that monitors one or more performance metrics 114 related to access to an application 110 by a number of monitored systems 102-108.

In one or more embodiments, application 110 includes a web application, a mobile application, a native application, and/or another type of client-server application that is accessed over a network 120. In turn, monitored systems 102-108 include personal computers (PCs), laptop computers, tablet computers, mobile phones, portable media players, workstations, gaming consoles, and/or other network-enabled computing devices that are capable of executing application 110 in one or more forms.

During access to application 110, monitored systems 102-108 provide performance metrics 114 to application 110 and/or monitoring system 112 for subsequent analysis by monitoring system 112. For example, a computing device that retrieves one or more pages (e.g., web pages) or screens of application 110 over network 120 may transmit page load times, first byte times, content download times, rendering times, and/or other performance metrics 114 for the pages or screens to application 110. As a result, monitored systems 102-108 may include functionality to perform real user monitoring (RUM) during use of application 110.

In addition, one or more monitored systems 102-108 may be monitored indirectly through performance metrics 114 reported by other monitored systems. For example, the performance of a server and/or data center may be monitored by collecting page load times, latencies, and/or other performance metrics 114 from client computer systems that request pages, data, and/or application components from the server and/or data center.

Performance metrics 114 from monitored systems 102-108 are aggregated by application 110 and/or other monitored systems, such as the data server from which application 110 is served. Performance metrics 114 are then provided to monitoring system 112 for subsequent analysis.

More specifically, monitoring system 112 calculates quantiles 118 associated with performance metrics 114 based on dimensions 116 associated with performance metrics 114. For example, monitoring system 112 may calculate $90^{th}$ percentile page load times for different combinations of dimensions 116 such as locations, browser names and/or versions, operating systems, devices pages, and/or environments to characterize outliers in the distributions of the page load times. As described in further detail below, monitoring system 112 may use efficient representations of performance metrics 114 and/or dimensions 116 to calculate quantiles 118, thereby allowing quantiles 118 to be calculated more efficiently from performance metrics 114 and/or for more combinations of dimensions 116.

Figure 2:
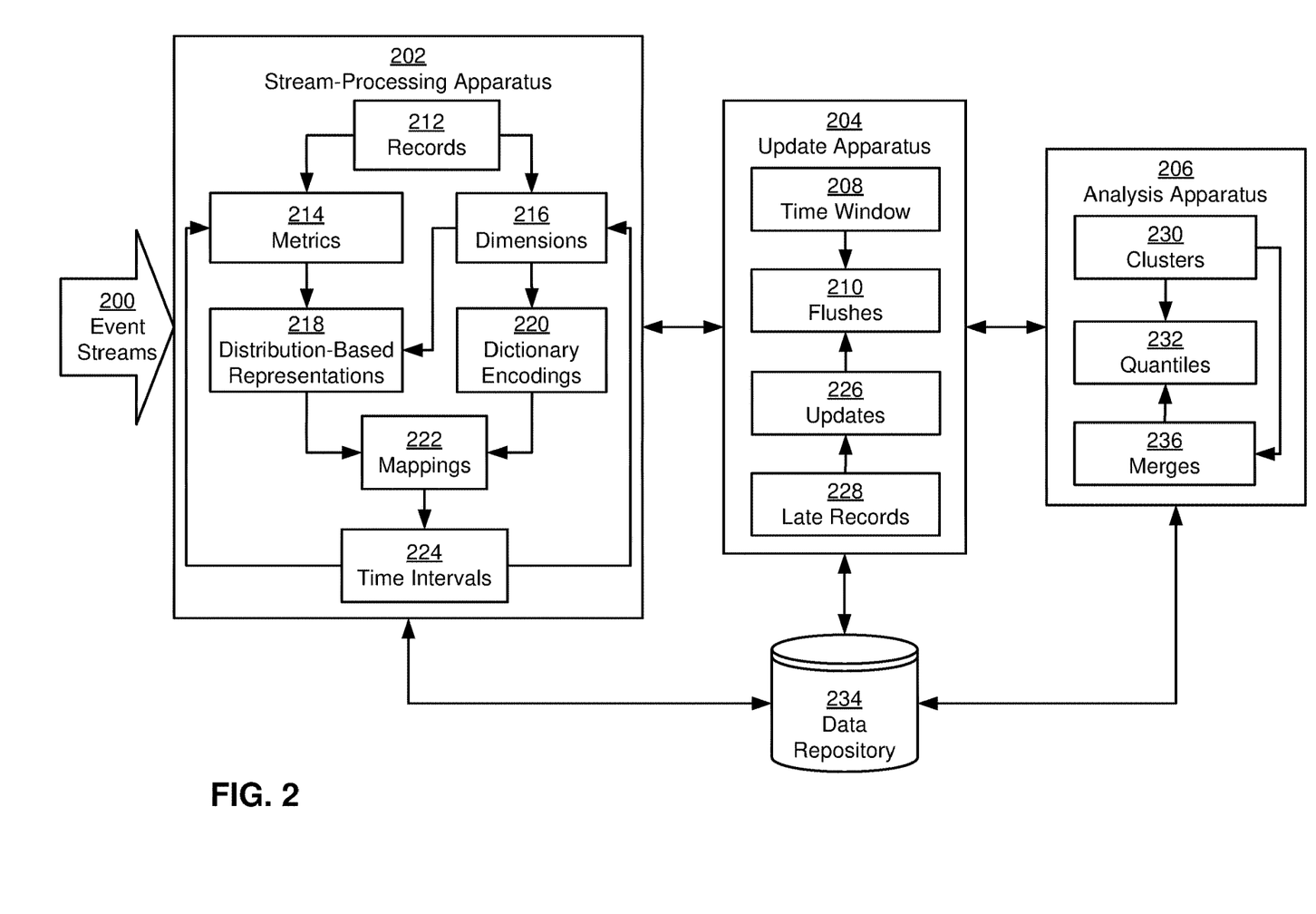
FIG. 2 shows a system for processing data in accordance with the disclosed embodiments.

FIG. 2 shows a system for processing data in accordance with the disclosed embodiments. More specifically, FIG. 2 shows a monitoring system such as monitoring system 112 of FIG. 1 that collects, analyzes, and/or processes performance metrics from a number of monitored systems. As shown in FIG. 2, the monitoring system includes a stream-processing apparatus 202, an update apparatus 204, and an analysis apparatus 206. Each of these components is described in further detail below.

Stream-processing apparatus 202 processes event streams 200 containing records 212 of page views, clicks, and/or other activity collected from an application (e.g., application 110 of FIG. 1) and/or one or more monitored systems (e.g., monitored systems 102-108). In one or more embodiments, event streams 200 are generated and/or maintained using a distributed streaming platform such as Apache Kafka (Kafka™ is a registered trademark of the Apache Software Foundation). When a certain type of activity (e.g., click, request, user session, download, etc.) occurs, a publisher in the distributed streaming platform generates a record of the activity. The distributed streaming platform then propagates the record to components subscribing to event streams 200, such as stream-processing apparatus 202. As a result, stream-processing apparatus 202 may receive and/or process large volumes of records 212 in event streams 200 on a real-time or near-real-time basis.

Records 212 include metrics 214 and dimensions 216 associated with the corresponding activities. For example, records 212 of activity related to loading of pages in an application may include metrics 214 such as page load times (e.g., the total time required to load a page), first byte times (e.g., the time over which the first byte of a download is received), render completion times (e.g., the time required to render a page), download times (e.g., the time required to download the content of a page), function execution times (e.g., the time required to execute a method or function), connection times (e.g., the time required to establish a connection), and/or other measures related to the performance, speed, and/or latency of the application. Such records 212 may also include dimensions 216 such as locations (e.g., country, state, Internet Protocol (IP) address, etc.), browsers (e.g., browser names, browser versions, etc.), operating systems, device types (e.g., mobile device manufacturers, models, etc.), protocols, page keys (e.g., identifiers of pages being loaded), and/or environments (e.g., data centers, points of presence (PoPs), autonomous system numbers (ASNs), production environments, testing environments, development environments, etc.) related to the page load activity. Consequently, records 212 received over event streams 200 may form a multidimensional data set such as an Online Analytical Processing (OLAP) cube.

In one or more embodiments, stream-processing apparatus 202 aggregates raw metrics 214 in records 212 into compact distribution-based representations 218 based on combinations of dimensions 216 associated with metrics 214. Each combination of dimensions 216 may include a specified or unspecified value for each dimension found in records 214. For example, combinations of dimensions 216 from a multidimensional data set containing dimensions 216 of location, product name, and month may include all possible values of all three dimensions, all possible values of two of the dimensions and a specific value for the remaining dimension (i.e., any location and product name with a specific month, any location and month with a specific product name, any product name and month with a specific location), all possible values of one dimension and specific values for the other two dimensions (i.e., a specific location and specific product name with any month, a specific location and specific month with any product name, a specific product name and specific month with any location), and specific values for all three dimensions. In turn, stream-processing apparatus 202 may aggregate a subset of metrics 214 from records that match a given combination of dimensions 216 into a distribution-based representation of the subset.

More specifically, each distribution-based representation includes a fixed and/or bounded set of values that captures and/or characterizes the distribution of a much larger number of metrics 214 that span a time interval (e.g., time intervals 224). For example, each distribution-based representation may include a t-digest of millions to billions of metrics 214 generated over a five-minute interval for a corresponding combination of dimensions 216. To produce the t-digest, stream-processing apparatus 202 generates a fixed number of clusters 230 from a subset of metric values associated with a corresponding combination of dimensions 216. When a new metric associated with the combination of dimensions 216 is received (e.g., from event streams 200), stream-processing apparatus 202 adds the metric to the closest cluster in the t-digest. Alternatively, stream-processing apparatus 202 buffers a batch of metric values, sorts the buffered values, and merges the buffered values with one another and/or previously created clusters 230 to produce an updated representation of the t-digest.

Within each t-digest, stream-processing apparatus 202 represents each cluster using a "center" value that stores the average of all values in the cluster and a "mass" that stores the number of values in the cluster. Stream-processing apparatus 202 optionally produces smaller clusters 230 near the ends of the distribution and larger clusters 230 near the middle of the distribution to increase the accuracy of quantile estimation near the tails of the distribution while maintaining reasonable accuracy near the median of the distribution.

Such generation of distribution-based representations 218 from metrics 214 may reduce computational and/or memory overhead associated with storing large quantities of metrics 214 and/or calculating quantiles 232 associated with metrics 214. For example, the size of each distribution-based representation may be a function of the number of t-digest clusters 230 instead of the number of data points in the distribution. In turn, quantiles 232 may be calculated from values associated with the clusters instead of from an ordered set of all metric values associated with a given combination of dimensions 216.

To further reduce memory and/or space consumption associated with aggregating metrics 214 for different combinations of dimensions 216, stream-processing apparatus 202 produces dictionary encodings 220 of all combinations of dimensions 216 for which distribution-based representations 218 are created. Each dictionary encoding may include a tuple of ordered dimensions found in some or all records 212 that fall within a given time interval. For example, a dictionary encoding of each combination of dimensions 216 associated with page view metrics 214 may include a first element representing a page key, a second element representing a location, a third element representing a browser type, and so on.

Each element in the tuple encodes a corresponding dimensional value encountered in records 212 as an integer and/or other fixed-length representation. When a dimensional value is first encountered in a given set of records 212 that span a time interval, stream-processing apparatus 202 assigns an encoding (e.g., an integer value) to the dimensional value. When a different dimensional value for the same dimension is first encountered in the same set of records 212, stream-processing apparatus 202 may assign a different encoding (e.g., an incremented integer value) to the different dimensional value. Stream-processing apparatus 202 then stores the encoded dimensional values in a given combination of dimensions 216 in the corresponding positions within the tuple. Stream-processing apparatus 202 additionally stores "default" values at positions in the tuple that do not contain specified dimensional values for the combination of dimensions, with the default values representing all possible values of the corresponding dimensions and/or a lack of specified value for the corresponding dimensions.

Continuing with the previous example, stream-processing apparatus 202 may map page keys in a set of records 212 spanning a time interval to one set of integer values, locations in the same set of records 212 to another set of integer values, and browser types in the same set of records 212 to a third set of integer values. Stream-processing apparatus 202 may then represent each combination of dimensions 216 for which a distribution-based representation is to be produced as a tuple. The first element in the tuple contains a first integer encoding a page key value, the second element in the tuple contains a second integer encoding a location, and the third element in the tuple contains a third integer encoding a browser type. If a combination of dimensions does not specify a value for a given dimension, stream-processing apparatus 202 may store an integer value representing all possible values of the dimension in the dimension's position within the tuple.

Stream-processing apparatus 202 additionally creates a dictionary that maps dimensional values for each dimension to the corresponding dictionary encodings 220 to allow dictionary encodings 220 associated with the time interval to be decoded. For example, stream-processing apparatus 202 may include the dictionary in a data structure that stores dictionary encodings 220 and/or the corresponding distribution-based representations 218. As a result, stream-processing apparatus 202 may generate dictionary encodings 220 for dimensional values as the dimensional values are encountered within a given set of records 212 (e.g., records spanning a time interval) instead of requiring stream-processing apparatus 202 to produce dictionary encodings 220 from a comprehensive and/or up-to-date list of all possible dimensional values that can be found in records 212.

Stream-processing apparatus 202 stores mappings 222 between dictionary encodings 220 and distribution-based representations 218 as representations of the corresponding dimensions 216 and metrics 214. For example, stream-processing apparatus 202 may produce an in-memory representation of metrics 214 and dimensions 216 that span a given time interval as a series of mappings 222 within a "bucket" representing the time interval. Each mapping in the bucket includes a tuple containing a dictionary encoding of a given combination of dimensions 216, as well as a t-digest containing a fixed-size distribution-based representation of metrics 214 in the time interval that match the combination of dimensions 216. The "bucket" may additionally include a mapping of dimensional values encountered in records 212 spanning the time interval to the corresponding encoded values in dictionary encodings 220.

Stream-processing apparatus 202 may additionally generate distribution-based representations 218, dictionary encodings 220, and/or mappings 222 in a distributed manner. For example, stream-processing apparatus 202 may divide records 212 from event streams 200 that contain timestamps that fall within a given time interval into a set of partitions. Each partition may include a subset of records 212 associated with one or more combinations of dimensions 216 for which distribution-based representations 218 and/or quantiles 232 are to be calculated. Stream-processing apparatus 202 may also, or instead, divide a large subset of records 212 associated with one combination of dimensions 216 (e.g., all possible values of some or all dimensions 216) into multiple partitions to generate partitions that are of substantially equal size.

After partitions of records 212 are generated, stream-processing apparatus 202 may distribute the partitions among a set of processing nodes, and each processing node may calculate one or more distribution-based representations 218 for combinations of dimensions 216 found within the corresponding partition. When two or more distribution-based representations 218 are produced by different processing nodes for the same combination of dimensions 216, stream-processing apparatus 202 and/or one of the processing nodes may merge the distribution-based representations into a single distribution-based representation of metrics 214 for that combination of dimensions 216 (e.g., by merging t-digest clusters from the distribution-based representations). Stream-processing apparatus 202 and/or one of the processing nodes may also, or instead, merge distribution-based representations 218 associated with different combinations of dimensions 216 (e.g., different values of page keys, locations, and/or browser types) to generate distribution-based representations 218 of unions of the combinations of dimensions 216 (e.g., multiple or all values of page keys, locations, and/or browser types). Stream-processing apparatus 202 may then convert combinations of dimensions 216 in records 212 into dictionary encodings 220 and map dictionary encodings 220 to the corresponding distribution-based representations 218 produced by the processing nodes.

Update apparatus 204 manages the transfer of mappings 222, distribution-based representations 218, and/or dictionary encodings 220 between memory and a persistent data repository 234. More specifically, update apparatus 204 stores multiple buckets of in-memory representations of distribution-based representations 218 that are mapped to the corresponding dictionary encodings 220, with each bucket spanning one time interval. In other words, each bucket may contain an OLAP cube of metrics 214 and dimensions 216 in records 212 spanning the time interval. After the buckets fill a time window 208 represented by multiple time intervals 224, update apparatus 204 performs flushes 210 of some or all in-memory buckets to data repository 234 and/or another persistent data store. For example, update apparatus 204 may maintain one or more buckets that span five-minute intervals in memory on one or more processing nodes and/or computer systems. When the time spanned by all in-memory buckets fills a 12-minute time window 208, update apparatus 204 may transfer one or more of the oldest buckets from memory to a database, filesystem, flat file, event stream, and/or other data store or data source providing data repository 234.

Update apparatus 204 also applies updates 226 to previously flushed buckets based on late records 228 received over event streams 200. Late records 228 include metrics 214 and dimensions 216 related to activity occurring in time intervals 224 that have already been flushed to data repository 234. For example, receipt of late records 228 may be delayed over event streams 200 due to issues with publishing late records 228 and/or transmitting late records 228 to stream-processing apparatus 202 and/or other subscribers of event streams 200.

Because late records 228 are associated with mappings 222 of distribution-based representations 218 and dictionary encodings 220 that have already been transferred to data repository 234, stream-processing apparatus 202 may be unable to update in-memory representations of mappings 222 using metrics 214 and/or dimensions 216 in late records 228. Instead, stream-processing apparatus 202 transmits late records 228 to update apparatus 204 (e.g., over one or more additional event streams 200 assigned to a "late record" topic), and update apparatus 204 retrieves mappings 222 related to late records 228 from data repository 234. Update apparatus 204 then matches dimensions 216 in late records 228 to the corresponding dictionary encodings 220 in the retrieved mappings 222 and merges metrics 214 in late records 228 into the corresponding distribution-based representations 218 (e.g., by updating the centers and masses of clusters to which the metric values are assigned). Finally, update apparatus 204 writes the updated distribution-based representations 218 to data repository 234 and/or another data source.

Analysis apparatus 206 uses clusters 230 in distribution-based representations 218 from stream-processing apparatus 202, update apparatus 204, data repository 234, event streams 200, and/or another data source to calculate quantiles 232 associated with the corresponding metrics 214 and dimensions 216. For example, analysis apparatus 206 may calculate pre-determined quantiles 232 (e.g., $10^{th}$ percentile, $90^{th}$ percentile median, etc.) from clusters 230 and/or quantiles 232 that are specified in queries of the corresponding combinations of dimensions 216. In another example, analysis apparatus 206 may calculate quantiles 232 specified in queries associated with metrics 214 and/or dimensions 216 from clusters 230 in distribution-based representations 218 that are mapped to dictionary encodings 220 of combinations of dimensions 216 specified in the queries.

To calculate a given quantile from clusters 230 in a distribution-based representation, analysis apparatus 206 sums the combined centers and masses of clusters 230 to the left of the quantile in the distribution and divides the sum by the total combined centers and masses of all clusters 230 in the distribution-based representation. When the quantile does not fall exactly in the center of a cluster, analysis apparatus 206 interpolates the value of the quantile based on clusters 230 in the vicinity of the quantile's location in the distribution-based representation. After quantiles 232 are calculated, analysis apparatus 206 may output quantiles 232 in response to queries and/or store quantiles 232 with the corresponding metrics 214, combinations of dimensions 216, distribution-based representations 218, dictionary encodings 220, mappings 222, and/or other related data in data repository 234 and/or another data store.

Analysis apparatus 206 also includes functionality to perform merges 236 of clusters 230 prior to calculating some or all quantiles 232. For example, analysis apparatus 206 may merge clusters 230 from distribution-based representations 218 spanning two or more consecutive time intervals 224 to produce a merged cluster representing the distribution of one or more metrics 214 across the merged time intervals 224. To perform merges 236, analysis apparatus 206 merges centers and masses of consecutive clusters 230 in distribution-based representations 218, up to a size limit associated with each cluster that is based on the cluster's position within the distribution (e.g., near the tail of the distribution or near the middle of the distribution).

By calculating quantiles for multiple dimensional combinations using compact distribution-based representations of the corresponding metrics and dictionary encodings of the dimensional combinations, the disclosed embodiments may allow the quantile computations to scale with data volume and/or numbers of dimensions. In turn, the disclosed embodiments may allow quantiles to be computed from streaming data on a real-time or near-real-time basis. The disclosed embodiments may additionally reduce computational and/or memory overhead associated with conventional techniques that calculate quantiles based on orderings of raw data points and/or that associate the data points and/or quantiles with uncompressed representations of the corresponding dimensional combinations. Consequently, the disclosed embodiments may improve the performance of applications, computer systems, and/or technologies for processing streaming data, monitoring performance metrics, and/or calculating quantiles from metrics.

Those skilled in the art will appreciate that the system of FIG. 2 may be implemented in a variety of ways. First, data repository 234, stream-processing apparatus 202, update apparatus 204, and analysis apparatus 206 may be provided by a single physical machine, multiple computer systems, one or more virtual machines, a grid, one or more databases, one or more filesystems, and/or a cloud computing system. Stream-processing apparatus 202, update apparatus 204, and analysis apparatus 206 may additionally be implemented together and/or separately by one or more hardware and/or software components and/or layers.

Second, a number of techniques and/or data structures may be used to produce distribution-based representations 218, dictionary encodings 220, mappings 222, clusters 230, and/or other data used by the system to calculate quantiles 232. For example, distribution-based representations 218 may be produced using Q-digests, bucket sorts, data sketches, histograms, and/or other techniques for representing or sampling distributions of metrics 214. In another example, dictionary encodings 220 may include binary and/or other non-integer encodings of dimensions 216 to further reduce the space required to represent each combination of dimensions 216 for which quantiles 232 are to be calculated.

Third, the system may be adapted to processing records 212 and/or calculating quantiles 232 associated with different types of data. For example, the system may be used to aggregate metrics 214 and/or dimensions 216 associated with sensor data, usage data, financial data, scientific data, telemetry data, and/or other types of time-series data.

Figure 3:
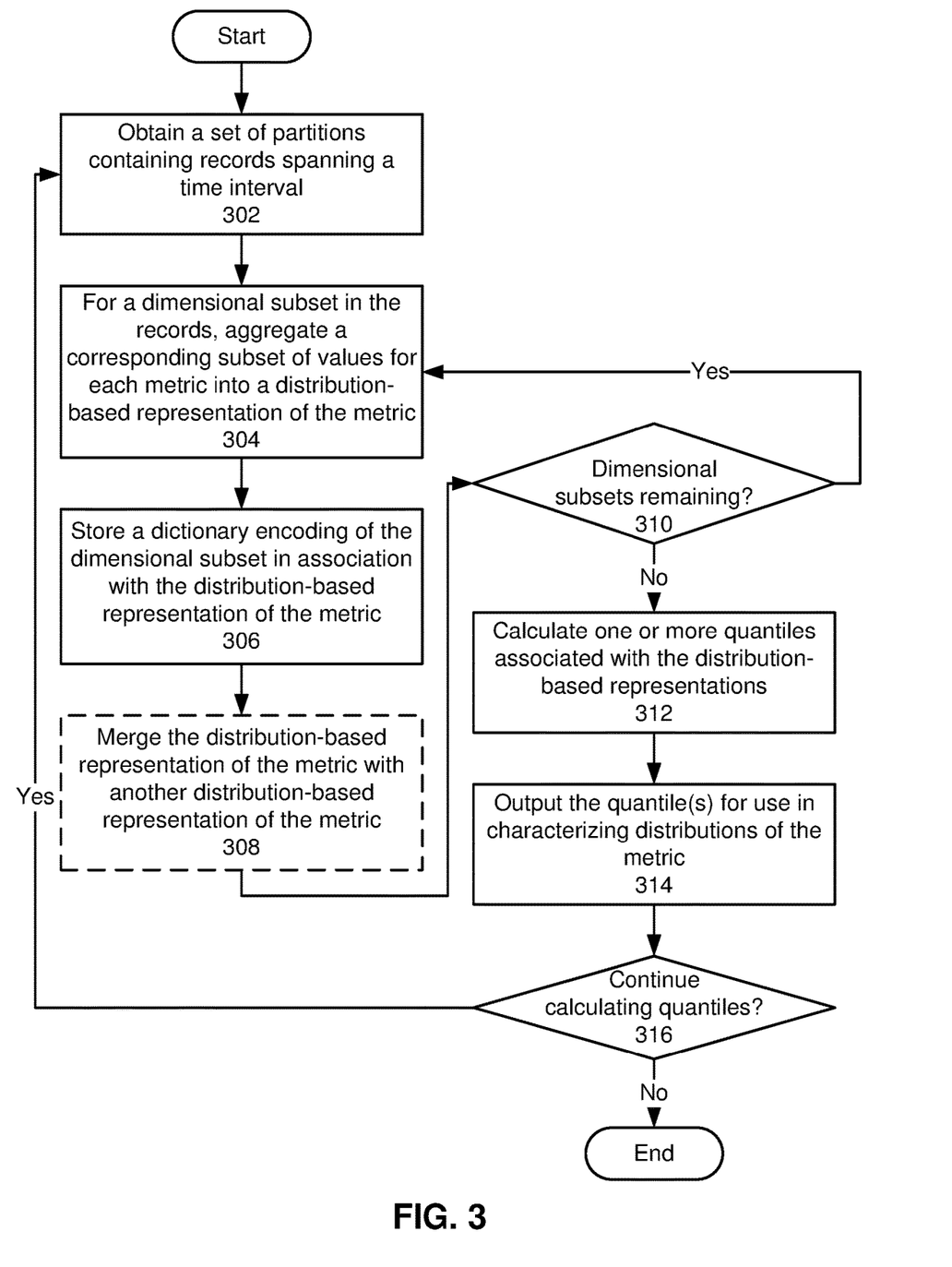
FIG. 3 shows a flowchart illustrating a process of calculating quantiles in a multidimensional data set in accordance with the disclosed embodiments.

FIG. 3 shows a flowchart illustrating a process of calculating quantiles in a multidimensional data set in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a set of partitions containing records spanning a time interval is obtained (operation 302). For example, the records may include metrics and dimensions related to page load activity associated with an application. The metrics may include, but are not limited to, a page load time a first byte time, a render completion time, a download time, a function execution time, and/or a request time. The dimensions may include, but are not limited to, a location, a browser, an operating system, a device type, a protocol, a page key, and/or an environment. The records may be obtained from an event stream and divided into equal-sized partitions and/or partitions containing records associated with different combinations of dimensions. The set of partitions may then be distributed among the set of processing nodes in a substantially balanced fashion.

For a dimensional subset in the records, a corresponding subset of values for each metric is aggregated into a distribution-based representation of the metric (operation 304), as described in further detail below with respect to FIG. 4. A dictionary encoding of the dimensional subset is also stored in association with the distribution-based representation of the metric (operation 306). For example, the dictionary encoding may be generated to reduce the amount of space required to store dimensions in the dimensional subset, as described in further detail below with respect to FIG. 5. A mapping of the dictionary encoding to the distribution-based representation may then be maintained in memory, flushed to a persistent data store, and/or updated based on late records, as described in further detail below with respect to FIG. 6.

The distribution-based representation of the metric is optionally merged with another distribution-based representation of the metric (operation 308). For example, distribution-based representations of a metric that span multiple adjacent time intervals may be merged to form a distribution-based representation of the metric across all of the time intervals. In another example, distribution-based representations produced by multiple processing nodes for the same dimensional subset may be merged to produce a final distribution-based representation of the metric for the dimensional subset.

Operations 304-308 may be repeated for remaining dimensional subsets (operation 310). For example, a distribution-based representation and dictionary encoding may be generated and stored for all combinations of dimensions in the records, a subset of the combinations, and/or different values for one or more dimensions in the records.

One or more quantiles associated with the distribution-based representations are calculated (operation 312) and outputted for use in characterizing distributions of the metric (operation 314). For example, pre-specified quantiles may be calculated from some or all distribution-based representations and outputted in event streams and/or data stores associated with the metrics and/or dimensions, or quantiles specified in queries related to the metrics and/or dimensions may be calculated and returned in response to the queries. In turn, the quantiles may be used to identify outliers in the metric's distribution and/or detect anomalies in an application and/or monitored system from which the metrics are collected.

Quantiles may continue to be calculated (operation 316) using distribution-based representations of metrics and dictionary encodings of the corresponding dimensions. For example, quantiles may be calculated for metrics and dimensions received within each of multiple time intervals. To calculate the quantiles for a given time interval, partitions containing records that span the time interval are obtained (operation 302), and values for the metric are aggregated into distribution-based representations of the metric for various dimensional subsets in the records (operation 304). Dictionary encodings of the dimensional subsets are stored in association with the corresponding distribution-based representations (operation 306), and distribution-based representations from different partitions and/or time intervals are optionally merged (operation 308). After distribution-based representations and dictionary encodings are produced for all dimensional subsets (operation 310), quantiles associated with the distribution-based representations are calculated and outputted (operations 312-314). Such calculation of quantiles may continue until distributions of the metrics are no longer being monitored and/or analyzed.

Figure 4:
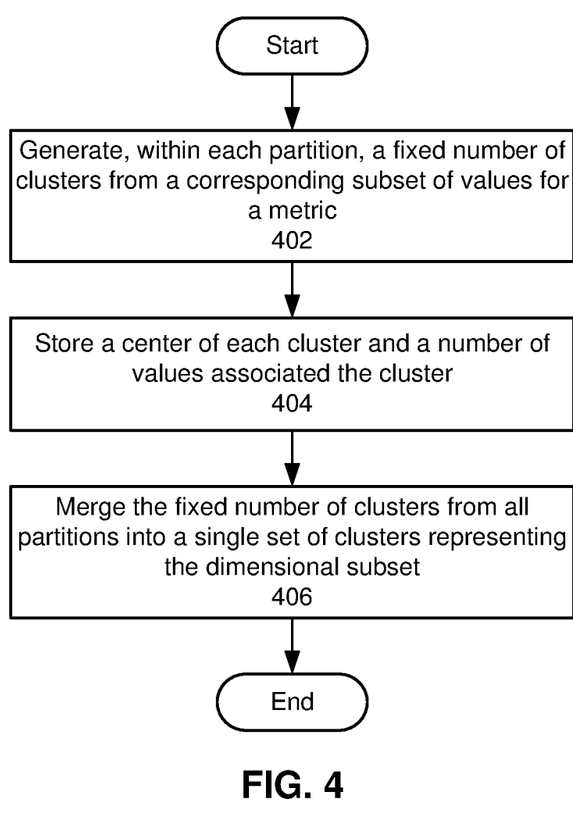
FIG. 4 shows a flowchart illustrating a process of generating a distribution-based representation of a metric in accordance with the disclosed embodiments.

FIG. 4 shows a flowchart illustrating a process of generating a distribution-based representation of a metric in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a fixed number of clusters is generated within each partition from a corresponding subset of values for a metric (operation 402). For example, the fixed number of clusters may be generated by adding newly received metric values to the closest cluster and/or by sorting buffered values of the metric and merging the sorted values with one another and/or previously created clusters.

Next, a center of each cluster and a number of values associated with the cluster are stored (operation 404) as a representation of the cluster. For example, the center may represent the average of all metric values in the cluster, and the number of values may represent the number of data points in the cluster.

Multiple sets of clusters from multiple partitions are then merged into a single set of clusters representing a given dimensional subset (operation 406). For example, multiple sets of clusters associated with the dimensional subset may be generated in a distributed fashion by multiple processing nodes and subsequently merged into a single set of clusters representing the distribution of the metric for the dimensional subset. In another example, multiple sets of clusters associated with different subsets of dimensions may be generated on different processing nodes and subsequently merged into a single set of clusters representing the distribution of the metric for a combination of dimensions that is a superset of the dimensional subsets.

Figure 5:
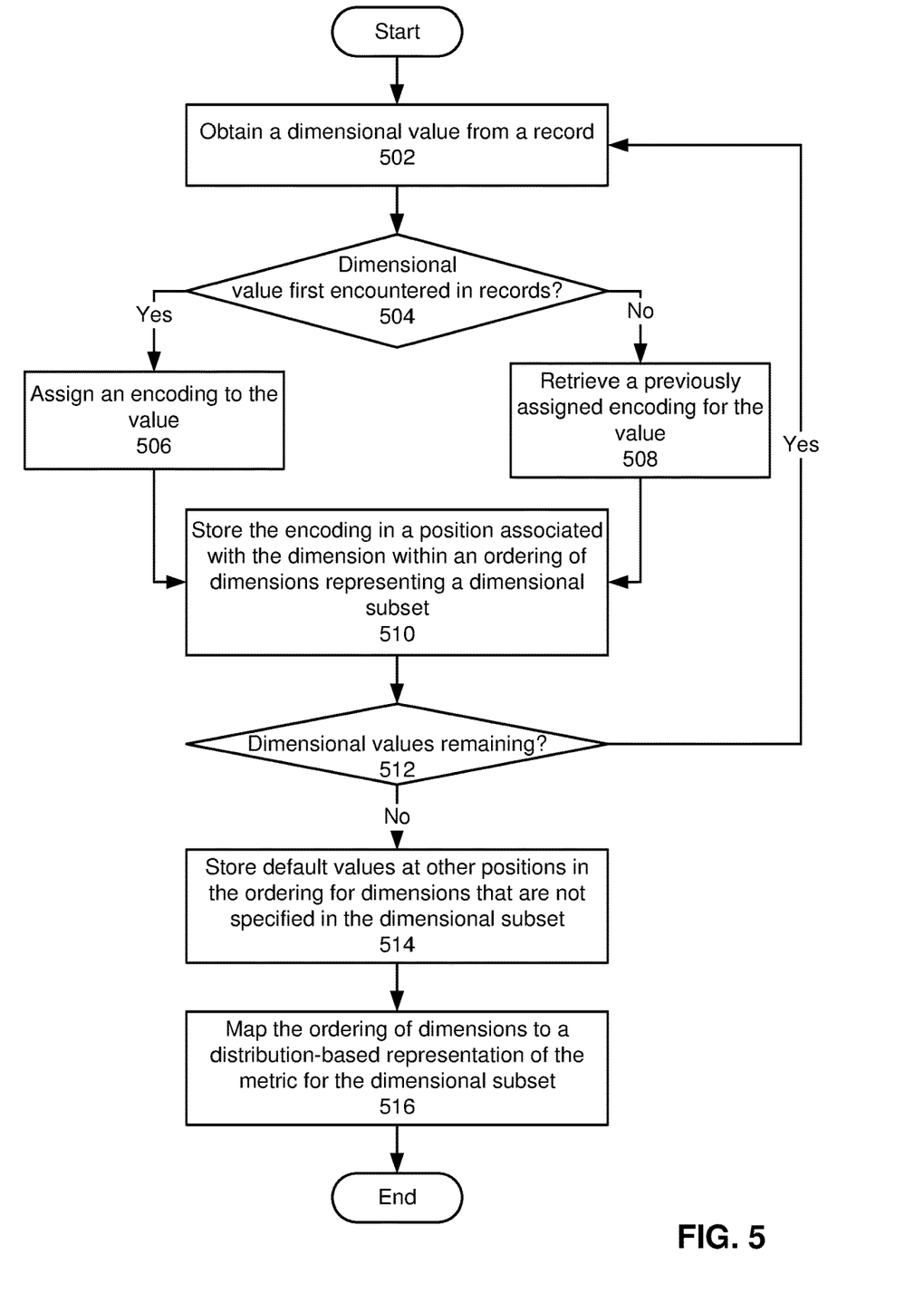
FIG. 5 shows a flowchart illustrating a process of generating a dictionary encoding of a dimensional subset in accordance with the disclosed embodiments.

FIG. 5 shows a flowchart illustrating a process of generating a dictionary encoding of a dimensional subset in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a dimensional value is obtained from a record (operation 502). For example, the dimensional value may be extracted from a field in the record that specifies the name of the corresponding dimension. Next, an encoding for the dimensional value is obtained based on the number of times the dimensional value has been encountered in a set of records (operation 504) containing the metric, such as records spanning a time interval. If the dimensional value is first encountered in the record and not in previous records, an encoding is assigned to the value (operation 506). For example, a unique integer, binary, and/or other fixed-size encoding may be assigned to the dimensional value within the dimension associated with the dimensional value. A mapping of the dimensional value to the encoding may also be stored in a dictionary associated with the dimension.

If the dimensional value has been previously encountered in other records containing the metric, a previously assigned encoding for the value is retrieved (operation 508). For example, the previously assigned encoding may be obtained from a dictionary that stores mappings between dimensional values in the dimension and encodings of the dimensional values.

The assigned or retrieved encoding is then stored in a position associated with the dimension within an ordering of dimensions representing a dimensional subset (operation 510). For example, the dimensional subset may be represented by a tuple of ordered dimensions, with each position in the tuple representing a corresponding dimension that can be found in the records. As a result, the encoding may be stored in the tuple at the position representing the dimension to indicate that the dimensional subset contains the corresponding dimensional value for the dimension.

Operations 502-510 may be repeated for remaining dimensional values (operation 512) in the record. For example, encodings may be assigned or retrieved for all dimensional values in the record and stored in the corresponding positions in the tuple representing the dimensional subset.

Default values are stored at other positions in the ordering for dimensions that are not specified in the dimensional subset (operation 514). For example, the default values may include encodings representing all possible values of each dimension and/or a lack of a specified value for the corresponding dimensions. Finally, the ordering of dimensions is mapped to a distribution-based representation of the metric for the dimensional subset (operation 516). For example, the ordering of dimensions may be used as an index and/or key to the distribution-based representation in a data structure and/or data store.

Figure 6:
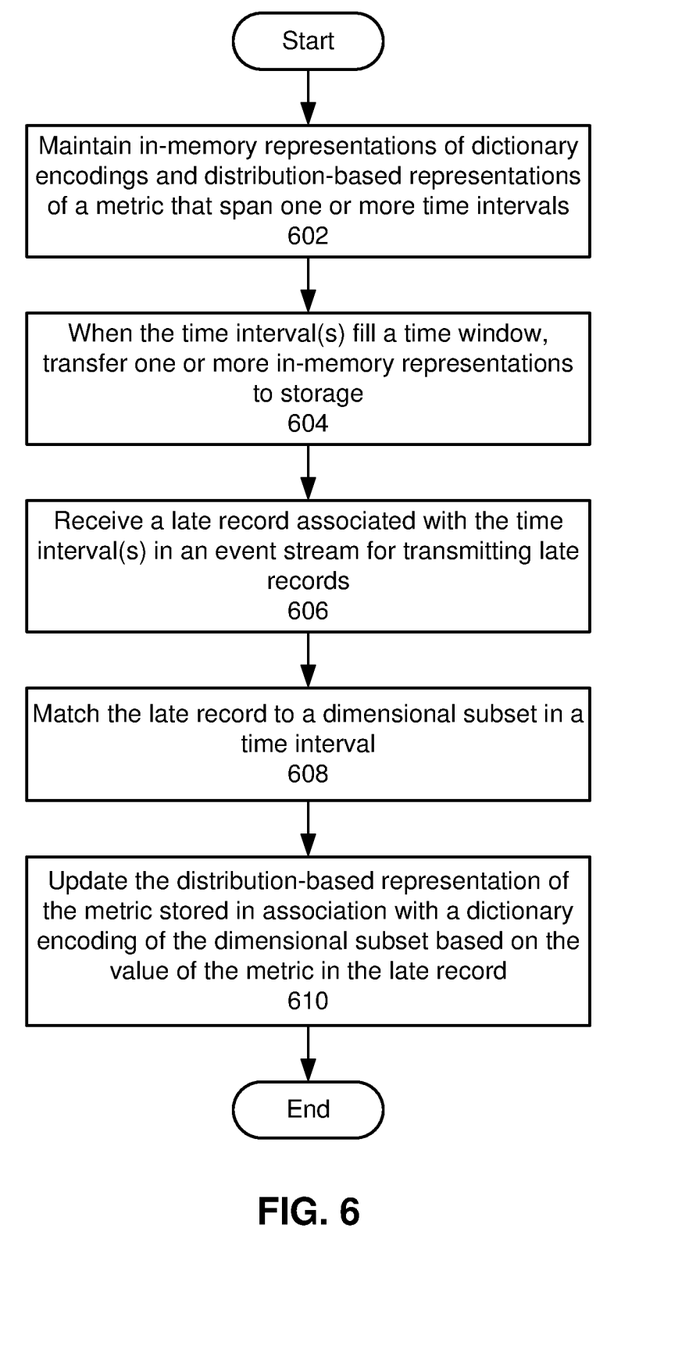
FIG. 6 shows a flowchart illustrating a process of storing dictionary encodings of dimensional subsets in association with distribution-based representations of metrics in accordance with the disclosed embodiments.

FIG. 6 shows a flowchart illustrating a process of storing dictionary encodings of dimensional subsets in association with distribution-based representations of metrics in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

First, in-memory representations are maintained of dictionary encodings and distribution-based representations of a metric that span one or more time intervals (operation 602). For example, the in-memory representations may include multiple buckets containing mappings of dictionary encodings to the corresponding distribution-based representations, with each bucket representing a time interval spanned by a corresponding set of records and/or metric values. The in-memory representations may be updated as new records associated with the same time interval are received.

When the time intervals(s) spanned by the in-memory representations fill a time window, one or more in-memory representations are transferred to storage (operation 604). For example, one or more of the oldest buckets may be flushed from memory to a database and/or event stream to allow new buckets to be written to the memory.

A late record associated with the time interval(s) is received in an event stream for transmitting late records (operation 606) and matched to a dimensional subset in a time interval (operation 608). For example, the late record may be excluded from records used to generate the in-memory representation because of issues with producing and/or transmitting the late record. Instead, the late record may be received over a different event stream, and dimensions in the late record may be matched to a dictionary encoding of the dimensions in storage.

Finally, the distribution-based representation of the metric that is stored in association with a dictionary encoding of the dimensional subset is updated based on the value of the metric in the late record (operation 610). For example, the stored distribution-based representation may be retrieved from storage and/or an event stream based on the corresponding dictionary encoding of dimensions in the late record, and the metric may be used to update the center and number of values in a cluster within the distribution-based representation. The updated distribution-based representation may then be rewritten to storage and/or outputted in the event stream as a replacement for the older version of the distribution-based representation.

Figure 7:
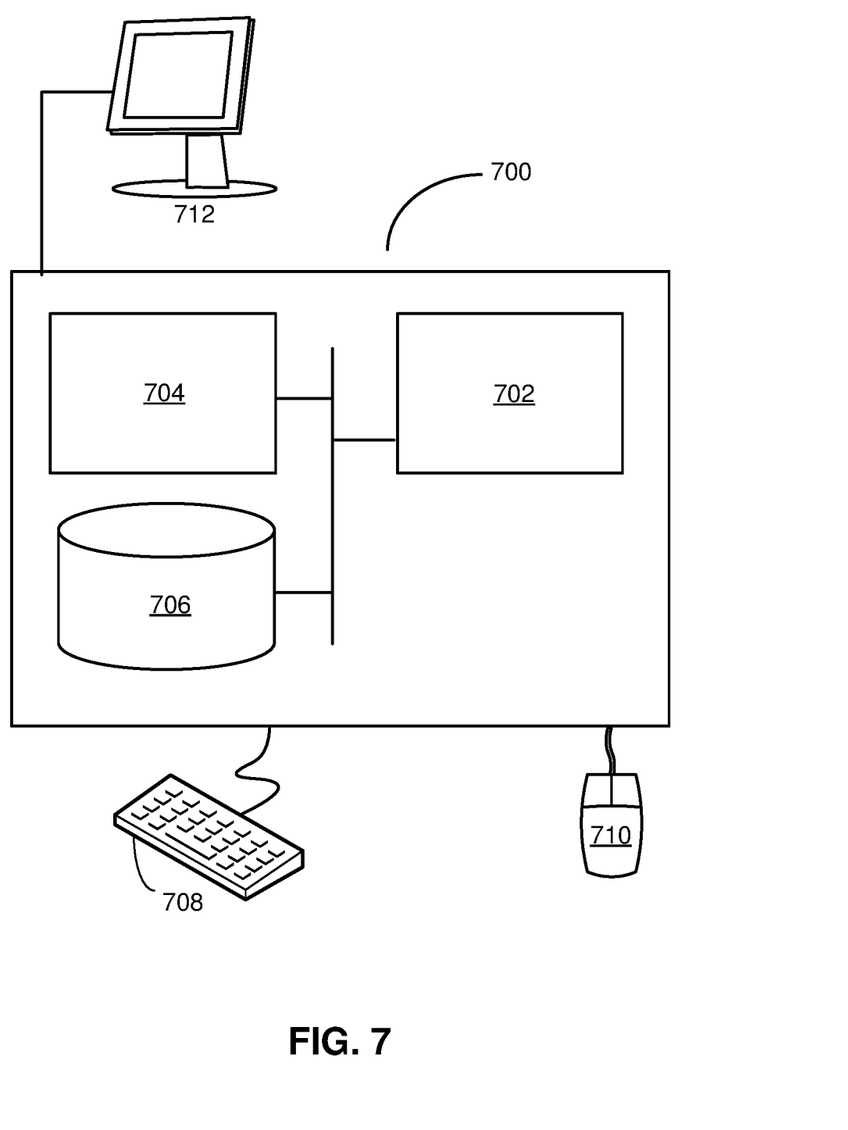
FIG. 7 shows a computer system in accordance with the disclosed embodiments.

FIG. 7 shows a computer system in accordance with the disclosed embodiments. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for processing data. The system includes a stream-processing apparatus, an update apparatus, and an analysis apparatus, one or more of which may alternatively be termed or implemented as a module, mechanism, or other type of system component. The stream-processing apparatus obtains a set of partitions containing records spanning a time interval, wherein the records include a set of values for a metric and a set of dimensions associated with the set of values. For each dimensional subset associated with the set of dimensions, the stream-processing apparatus aggregates, based on the set of partitions, a corresponding subset of values for the metric into a distribution-based representation of the metric. The update apparatus then stores a dictionary encoding of the dimensional subset in association with the distribution-based representation of the metric. Finally, the analysis apparatus calculates, based on the distribution-based representation, one or more quantiles associated with the dimensional subset and outputs the quantile(s) for use in characterizing a distribution of the metric.

In one or more embodiments, computer system 700 provides a system for processing data. The system includes a stream-processing apparatus, an update apparatus, and an analysis apparatus, one or more of which may alternatively be termed or implemented as a module, mechanism, or other type of system component. The stream-processing apparatus obtains a set of partitions containing records spanning a time interval, wherein the records include a set of values for a metric and a set of dimensions associated with the set of values. For each dimensional subset associated with the set of dimensions, the stream-processing apparatus aggregates, based on the set of partitions, a corresponding subset of values for the metric into a distribution-based representation of the metric. The update apparatus then stores a dictionary encoding of the dimensional subset in association with the distribution-based representation of the metric. Finally, the analysis apparatus calculates, based on the distribution-based representation, one or more quantiles associated with the dimensional subset and outputs the quantile(s) for use in characterizing a distribution of the metric.

In addition, one or more components of computer system 700 may be remotely located and connected to the other components over a network. Portions of the present embodiments (e.g., stream-processing apparatus, update apparatus, analysis apparatus, data repository, event streams, application, monitoring system, etc.) may also be located on different nodes of a distributed system that implements the embodiments. For example, the present embodiments may be implemented using a cloud computing system that collects and aggregates performance metrics from a remote application and/or set of monitored systems into quantiles associated with the performance metrics.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:
1. A method, comprising:
obtaining, by a set of processing nodes, a set of partitions comprising records spanning a time interval, wherein the records comprise a set of values for a metric and a set of dimensions associated with the set of values;
for each dimensional subset associated with the set of dimensions, aggregating, by the set of processing nodes based on the set of partitions, a corresponding subset of values for the metric into a distribution-based representation of the metric;
storing a dictionary encoding of the dimensional subset in association with the distribution-based representation of the metric;
calculating, based on the distribution-based representation, one or more quantiles associated with the dimensional subset; and
outputting the one or more quantiles for use in characterizing a distribution of the metric.
2. The method of claim 1, wherein aggregating the corresponding subset of values for the metric into the distribution-based representation of the metric comprises:
generating a fixed number of clusters from the corresponding subset of values for the metric; and
for each cluster in the fixed number of clusters, storing a center of the cluster and a number of values associated with the cluster.

3. The method of claim 2, wherein aggregating the corresponding subset of values for the metric into the distribution-based representation of the metric further comprises:

merging the fixed number of clusters from multiple partitions in the set of partitions into a single set of clusters representing the dimensional subset.

4. The method of claim 1, wherein storing the dictionary encoding of the dimensional subset in association with the distribution-based representation of the metric comprises:

when a value of a dimension in the dimensional subset is first encountered in the records, assigning an encoding to the value;

storing the encoding in a position associated with the dimension within an ordering of dimensions representing the dimensional subset; and mapping the ordering of the dimensions to the distribution-based representation of the metric for the dimensional subset.

5. The method of claim 4, wherein storing the dictionary encoding of the dimensional subset in association with the distribution-based representation of the metric further comprises:

when another dimension is not specified in the dimensional subset, storing a default value at another position for the other dimension within the ordering of dimensions.

6. The method of claim 1, wherein storing the dictionary encoding of the dimensional subset in association with the distribution-based representation of the metric comprises:

maintaining in-memory representations of dictionary encodings and distribution-based representations of the metric that span the time interval and one or more additional time intervals; and when the time interval and the one or more additional time intervals spanned by the in-memory representations fill a time window, transferring one or more of the in-memory representations to storage.

7. The method of claim 6, wherein storing the dictionary encoding of the dimensional subset in association with the distribution-based representation of the metric further comprises:

after the dictionary encoding and the distribution-based representation of the metric are transferred to the storage, receiving a late record associated with the time interval in an event stream;

matching the late record to the dimensional subset; and updating the distribution-based representation of the metric stored in association with the dictionary encoding of the dimensional subset in the storage based on a value of the metric in the late record.

8. The method of claim 1, further comprising:

merging, based on the stored dictionary encoding of the dimensional subset, the distribution-based representation of the metric with another distribution-based representation of the metric for the dimensional subset and a different time interval; and calculating an additional quantile based on the merged distribution-based representation of the metric and the other distribution-based representation of the metric.

9. The method of claim 1, wherein obtaining the set of partitions comprising the records comprises:

dividing an event stream comprising the records into the set of partitions; and distributing the set of partitions among the set of processing nodes.

10. The method of claim 1, wherein the set of dimensions comprises at least one of:
a location;
a browser;
an operating system;
a device type;
a protocol;
a page key; or
an environment.

11. The method of claim 1, wherein the metric comprises at least one of:
a page load time;
a first byte time;
a render completion time;
a download time;
a function execution time; or
a request time.

12. A system, comprising:
one or more processors; and
memory storing instructions that, when executed by the one or more processors, cause the system to:

obtain a set of partitions comprising records spanning a time interval, wherein the records comprise a set of values for a metric and a set of dimensions associated with the set of values;

for each dimensional subset associated with the set of dimensions, aggregate, based on the set of partitions, a corresponding subset of values for the metric into a distribution-based representation of the metric;

store a dictionary encoding of the dimensional subset in association with the distribution-based representation of the metric;

calculate, based on the distribution-based representation, one or more quantiles associated with the dimensional subset; and output the one or more quantiles for use in characterizing a distribution of the metric.

13. The system of claim 12, wherein aggregating the corresponding subset of values for the metric into the distribution-based representation of the metric comprises:

generating a fixed number of clusters from the corresponding subset of values for the metric; and for each cluster in the fixed number of clusters, storing a center of the cluster and a number of values associated with the cluster.

14. The system of claim 12, wherein storing the dictionary encoding of the dimensional subset in association with the distribution-based representation of the metric comprises:

when a value of a dimension in the dimensional subset is first encountered in the records, assigning an encoding to the value;

storing the encoding in a position associated with the dimension within an ordering of dimensions representing the dimensional subset;

mapping the ordering of the dimensions to the distribution-based representation of the metric for the dimensional subset; and when another dimension is not specified in the dimensional subset, storing a default value at another position for the other dimension within the ordering of dimensions.

15. The system of claim 12, wherein storing the dictionary encoding of the dimensional subset in association with the distribution-based representation of the metric comprises:

maintaining in-memory representations of dictionary encodings and distribution-based representations of the metric that span the time interval and one or more additional time intervals; and when the time interval and the one or more additional time intervals spanned by the in-memory representations fill a time window, transferring one or more of the in-memory representations to storage.

16. The system of claim 15, wherein storing the dictionary encoding of the dimensional subset in association with the distribution-based representation of the metric further comprises:

after the dictionary encoding and the distribution-based representation of the metric are transferred to the storage, receiving a late record associated with the time interval in an event stream associated with late records;

matching the late record to the dimensional subset; and updating the distribution-based representation of the metric stored in association with the dictionary encoding of the dimensional subset in the storage based on a value of the metric in the late record.

17. The system of claim 12, wherein the memory further stores instructions that, when executed by the one or more processors, cause the system to:

merge, based on the stored dictionary encoding of the dimensional subset, the distribution-based representation of the metric with another distribution-based representation of the metric for the dimensional subset and a different time interval; and calculate an additional quantile based on the merged distribution-based representation of the metric and the other distribution-based representation of the metric.

18. A non-transitory computer-readable storage medium storing instructions that when executed by a computer cause the computer to perform a method, the method comprising:

obtaining a set of partitions comprising a records spanning a time interval, wherein the records comprise a set of values for a metric and a set of dimensions associated with the set of values;

for each dimensional subset associated with the set of dimensions, aggregating, based on the set of partitions, a corresponding subset of values for the metric into a distribution-based representation of the metric;

storing a dictionary encoding of the dimensional subset in association with the distribution-based representation of the metric;

calculating, based on the distribution-based representation, one or more quantiles associated with the dimensional subset; and outputting the one or more quantiles for use in characterizing a distribution of the metric.

19. The non-transitory computer-readable storage medium of claim 18, wherein storing the dictionary encoding of the dimensional subset in association with the distribution-based representation of the metric comprises:

when a value of a dimension in the dimensional subset is first encountered in the records, assigning an encoding to the value;

storing the encoding in a position associated with the dimension within an ordering of dimensions representing the dimensional subset; and mapping the ordering of the dimensions to the distribution-based representation of the metric for the dimensional subset.

20. The non-transitory computer-readable storage medium of claim 18, wherein storing the dictionary encoding of the dimensional subset in association with the distribution-based representation of the metric comprises:

maintaining in-memory representations of dictionary encodings and distribution-based representations of the metric that span the time interval and one or more additional time intervals; and when the time interval and the one or more additional time intervals spanned by the in-memory representations fill a time window, transferring one or more of the in-memory representations to storage.

* * * * *